US005781819A

United States Patent [19]

Brunner et al.

[11] Patent Number: 5,781,819

[45] Date of Patent: Jul. 14, 1998

[54] DEVICE FOR FEEDING FILM CARTRIDGES

[75] Inventors: Jürgen Brunner, München; Helmut Zangenfeind, Puchheim; Reinhart Wuerfel, München; Peter Effenberger, Tegernsee, all of Germany

[73] Assignee: AGFA-Gevaert Aktiengesellschaft, Leverkusen, Germany

[21] Appl. No.: 738,674

[22] Filed: Oct. 25, 1996

[30] Foreign Application Priority Data

Oct. 25, 1995 [DE] Germany ........................ 195 39 732.0

[51] Int. Cl.$^{6}$ .................................................... G03B 13/00

[52] U.S. Cl. ........................... 396/567; 396/564; 396/612

[58] Field of Search .................................... 396/564, 567, 396/570, 598, 612, 617, 620, 622, 624, 646, 512, 647, 648; 352/72, 74; 242/337

[56] References Cited

U.S. PATENT DOCUMENTS 5,229,802 7/1993 Shiota et al. ............................ 396/564
5,450,160 9/1995 Tianello et al. ......................... 396/564
5,488,448 1/1996 Merle et al. ............................ 396/617
5,523,816 6/1996 Sherman et al. ........................ 396/647

FOREIGN PATENT DOCUMENTS 0212134 3/1987 European Pat. Off. ........ G03B 15/00

*Primary Examiner*—A. A. Mathews
*Attorney, Agent, or Firm*—Furgang & Milde, LLP

[57] ABSTRACT

A device for feeding film cartridges into a processing and/or handling apparatus, having a first feed channel so laid out that the cartridge moves by its own weight in the direction of its longitudinal axis through the channel. The cartridges lie one behind another in the direction of their longitudinal axis. To separate them, an apparatus is provided that holds one cartridge secure by frictional engagement, while the lower cartridge beneath moves down to a second feed channel. Cartridges which enter the second channel are displaced, one by one, along this channel and supplied at a feed point to the film processing and/or handling apparatus.

17 Claims, 3 Drawing Sheets

DEVICE FOR FEEDING FILM CARTRIDGES

FIELD OF THE INVENTION

The invention relates to the field of devices for automatic removal of a photographic film from a cartridge, and more particularly to devices for handling film cartridges in which a wound spool of film is placed, each having a longitudinal spool axis, down a feed channel of the device that is oriented so that the cartridge moves through the channel in the direction of its longitudinal axis by its own weight, with the guide having a cross section that conforms to the shape of the cartridge.

BACKGROUND OF THE INVENTION

In processing photographic films in a large laboratory, the films are removed from the film cartridge in a so-called splicer and glued together into a long strip. In this case, the rear end of each film and the front end of the following film must be positioned at a splicing station in such a way that ends can be joined by a splicing label. An example of a device of this type is described in, for example, EP OS 0 212 134. With these devices, a servicing person sits at the feed opening and feeds the film cartridges, working in rhythm with the machine.

However, often situations arise in which the servicing employee could work faster than the machine. On the other hand, the reverse situation also exists, with the employee working slower than the machine's rhythm, because, for example, there are problems with the film cartridges. This need to allow the servicing employee or operator to act asynchronously with the machine led to creation of a buffer which can be filled by the employee during times when faster cartridge feeding is possible, and drawn upon when the employee must be occupied with problem film cartridges.

SUMMARY AND OBJECTS OF THE INVENTION

Therefore, it is an object of the invention to provide a feed for a processing and/or handling apparatus configured so that film cartridges can be fed without regard to the working speed of the processing and/or handling apparatus, and be removed from it in correspondence to its working rhythm.

It is also an object of the present invention to provide a device for feeding film cartridges, each having a longitudinal axis, in a film handling device, comprising a feed channel for guiding film cartridges, disposed so that a cartridge in the feed channel moves through the channel in the direction of its longitudinal axis by its own weight; and means for separating adjacent cartridges in the direction of their longitudinal axis, by selectively holding an upper cartridge within the channel secure by frictional engagement, while allowing a lower cartridge to advance.

It is another object of the present invention to provide a device for feeding film cartridges in a processing and/or handling device having a feed channel that is laid out so that the cartridge moves through the channel in the direction of its longitudinal axis by its own weight, including a means for separating cartridges that lie one behind the other in the direction of their longitudinal axis, that holds a cartridge secure by frictional engagement, while the cartridge lying below is moved onward.

It is a further object of the present invention to provide a device for feeding cartridges to a processing and/or handling device having a longitudinally oriented feed channel, having a means separating cartridges in the feed channel, and a locking device beneath the means separating cartridges, having a first setting for blocking and a second setting for advancing a cartridge.

The separation mechanism makes it possible to feed cartridges automatically to the machine, without having to put them into individual chambers of a magazine that are separated from each other. In a very simple manner, a separation mechanism according to the present invention makes it possible to dispense with an active cartridge drive system. The cartridges move as a result of their own weight with a high degree of reliability in the processing or handling device.

For example, the separation mechanism can be provided at a place at which it acts directly on the cartridges which are held in reserve in a magazine. Similarly, it is possible to let the separation mechanism encroach directly on the feed channel of the device. Thus, the elements of the separation mechanism project into the space of the feed channel, touching a surface of a film cartridge.

To hold a cartridge securely until the one lying beneath it is fed to the device, various options are available. For example, a stream of air could be blown by a nozzle into the feed channel, compressing the cartridges against the opposite wall; the wall in turn can be provided with a friction lining. A kind of air bag is also possible, which is inflated to press against and hold the cartridges securely in the channel, and is then deflated, allowing the cartridges to advance. However, a clamping member is preferred because it has high reliability. The preferred clamping member is shaped like a stamp, and can be inserted through an opening in a side of the feed channel or magazine. In advantageous fashion, the forward part of the stamp that touches the cartridge consists of a material with a high coefficient of friction, or a material to which a friction-enhancing coating is applied. The clamping stamp is preferably driven by a pneumatic cylinder, and thus is provided as an inexpensive, reliable component, taking up a small amount of space.

It is advantageous to provide a locking mechanism beneath the clamping stamp. This can be shaped as a slide which completely seals off the drop shaft of the channel. It can also be shaped as a projection which can be inserted just far enough into the feed channel that at least the edge area of the cartridges lie on this projection, preventing further downward slippage. This lock is so controlled that it is in its closed setting when the clamping device is not activated. On the other hand, the lock is opened as soon as the clamping device securely holds a cartridge and possible additional overlying cartridges.

These and other objects and features of the present invention will become more fully apparent from the following description and appended claims taken in conjunction with the accompanying drawings, in which like numerals refer to like parts.

DETAILED DESCRIPTION OF THE PREFERRED EMBODIMENTS

Figure 1:
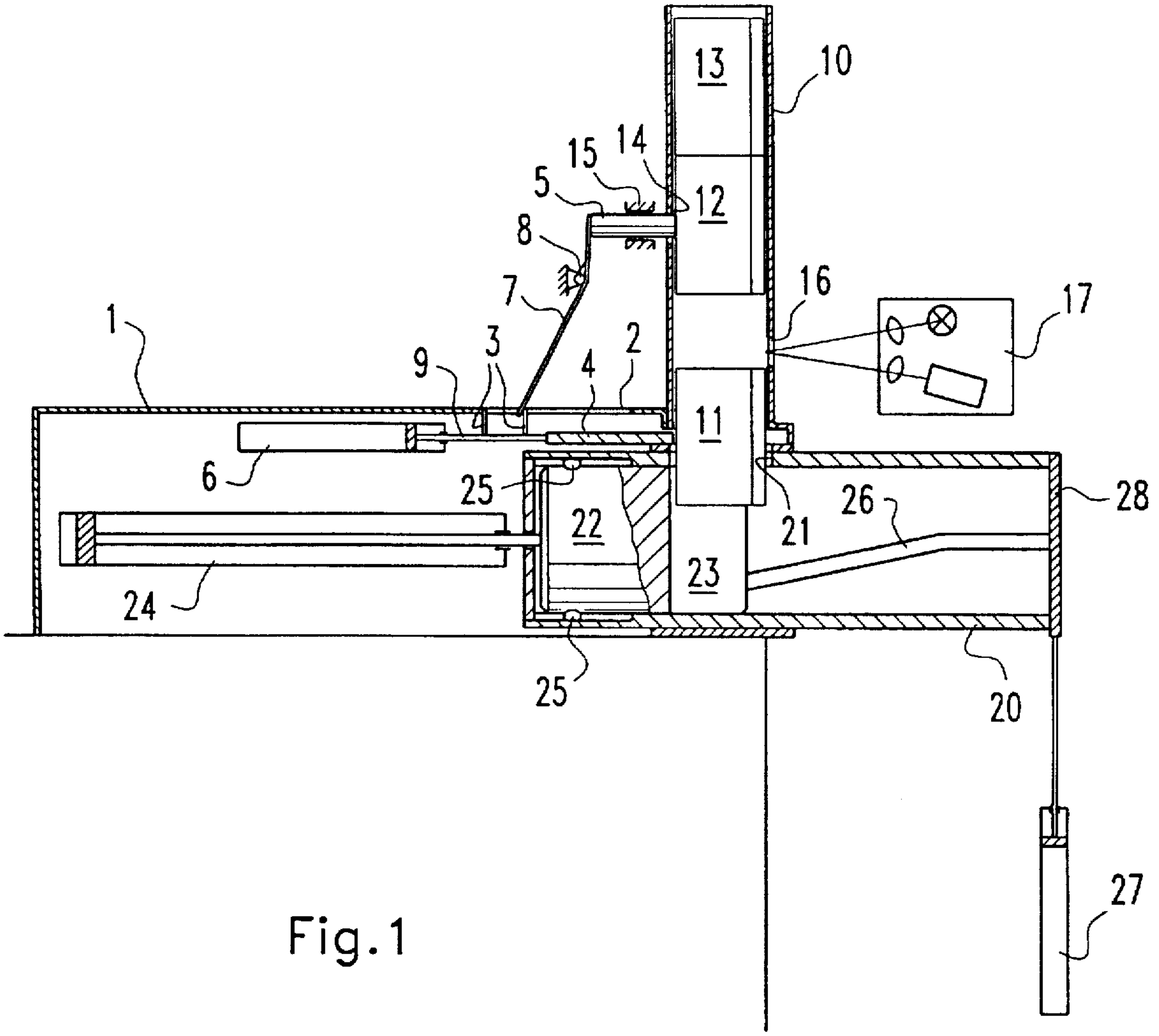
FIG. 1 shows an embodiment of the present invention with an activated clamping member.

The invention will now be described by way of the drawings, in which corresponding reference numerals indicate corresponding structures in the figures.

The figures show a particularly advantageous embodiment example, in which a clamping stamp 5 and a locking slide 4 are coupled to each other, so that they are moved together by a pneumatic cylinder 6. A leaf spring 7 is provided linking the locking slide 4 and the clamping stamp 5. The leaf spring 7 is pivotally supported by a housing by support 8, and rotates about this support 8. The shorter lever arm of leaf spring 7 is attached to the clamping stamp 5. The longer of the lever arms projects through an opening 2 of the upper housing cover 1 between two cams 3. These cams 3 are attached to a connecting rod 9 between the locking slide 4 and the pneumatic cylinder 6.

Figure 2:
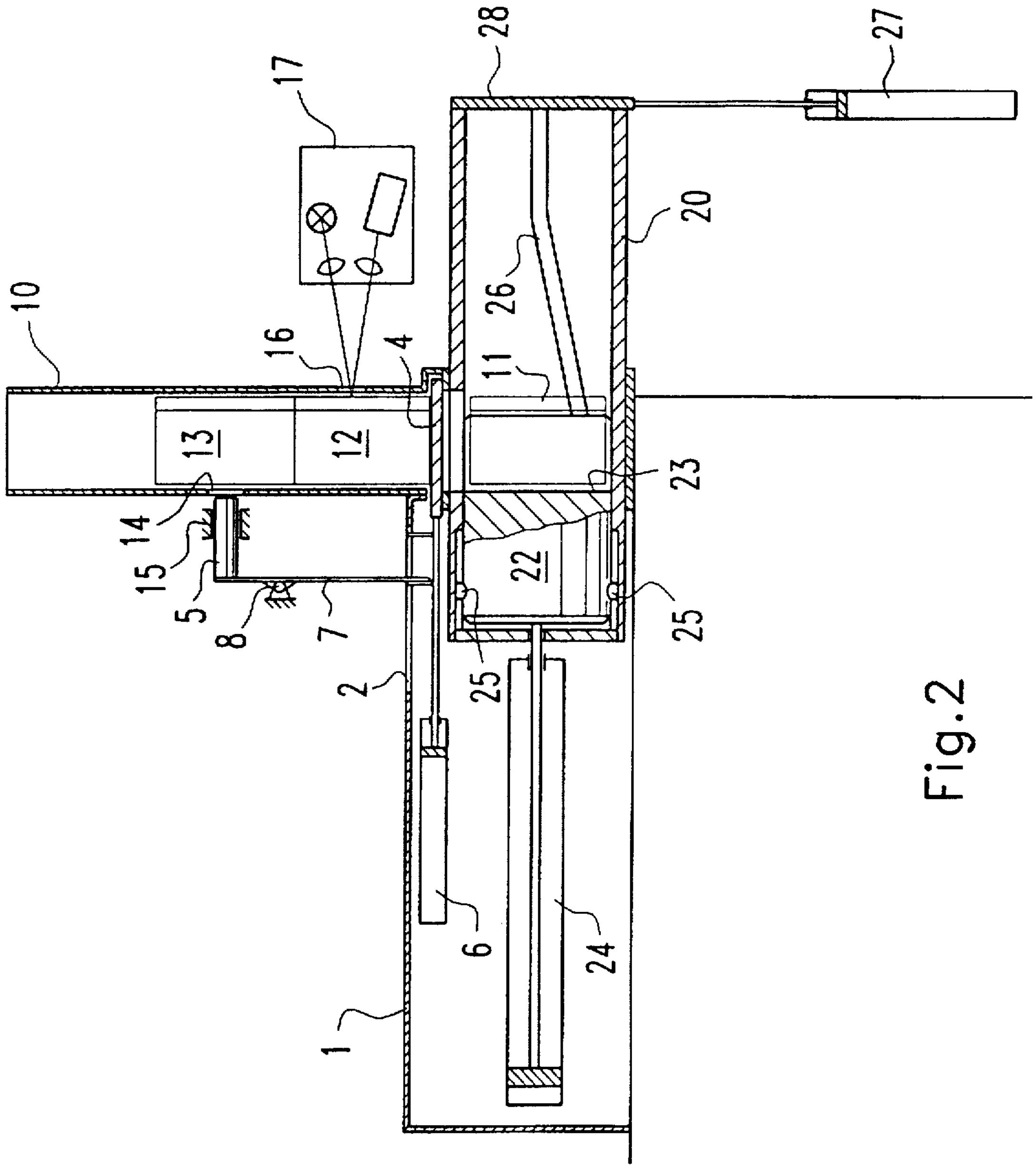
FIG. 2 shows the device according to FIG. 1 in its idle position.
Figure 3:
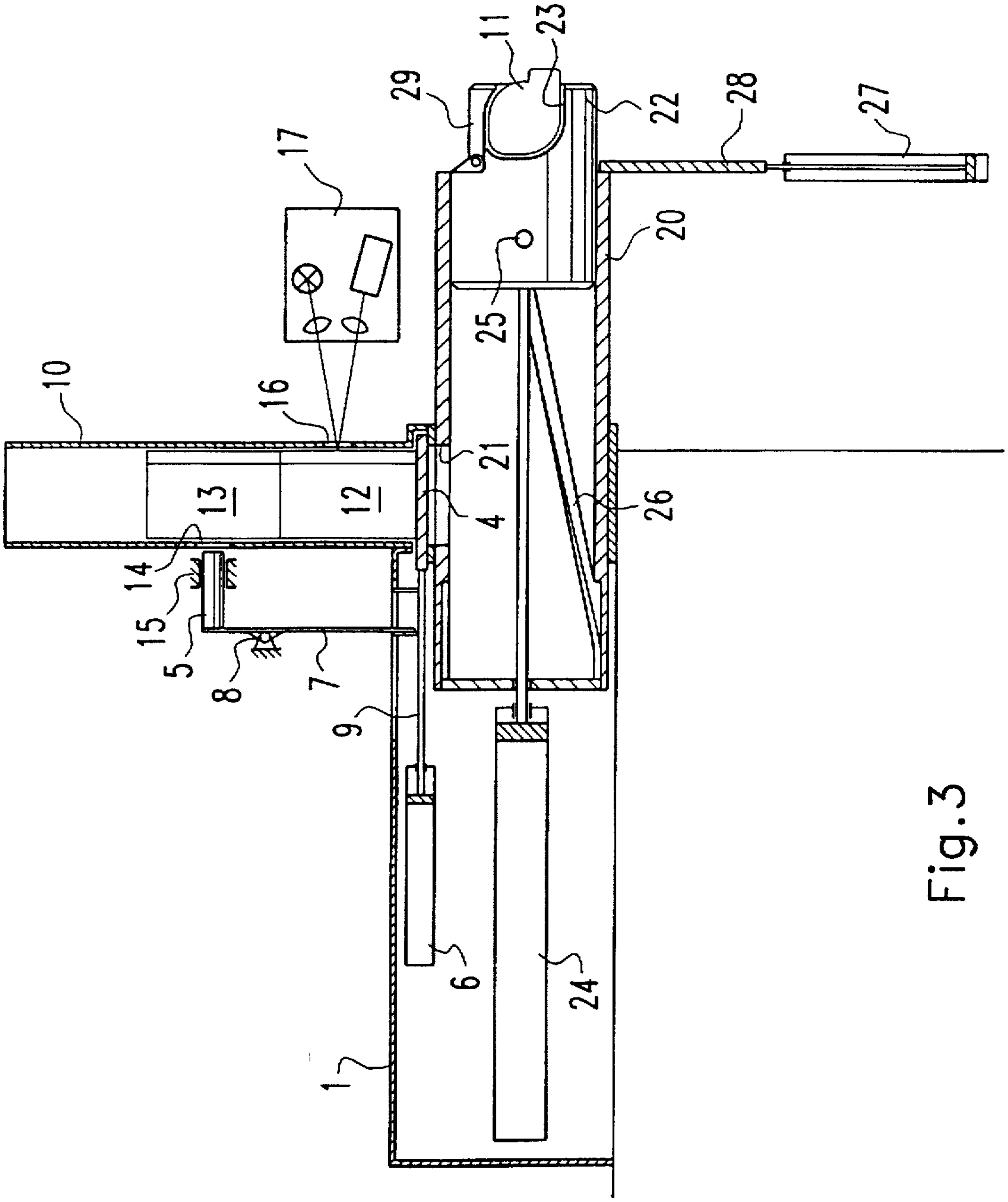
FIG. 3 shows the device as in FIG. 2, but with a cartridge in the extraction position.

Film cartridges 11, 12, 13 are fed from a tube 10, whose shape conforms to the shape of the cartridges. This tube can be designed either as shown in FIGS. 1–3 having a fixed feed shaft, or as a replaceable magazine. In the latter case it would be advantageous to provide the tube at its lower end with an additional locking device or seal, which is not shown. This prevents the cartridges from slipping out downwards when the replaceable magazine is inserted or mounted.

The tube 10 is provided with an opening 14, through which the clamping stamp 5, which is, for example a plunger, guided by friction bearing 15, can act on the cartridges to selectively allow advance downward. An additional opening 16 serves as the reading window for the scanner 17, to allow monitoring of the contents of the tube 10.

Beneath the locking slide 4, a cylindrical tube 20 is provided. This tube includes a feed opening 21 for cartridges 11, 12, 13. A cylindrically shaped sliding carriage 22, with a cartridge receiving chamber 23, is disposed in the tube 20. This sliding carriage 22 is rotatably linked to the piston rod of the pneumatic cylinder 24. Guiding pins 25 are provided within the tube 20 which are attached securely to the carriage, extending into the link slots 26 of the tube 20.

As shown in the Figures, to keep light out of the interior of the device, the guide slots 26 are designed as partial thickness grooves in the tube's inner wall. In this manner, when the locking slide 4 is open, no light incident on the tube can get through guide slots 26 into the device's interior. However, such a component has high fabrication costs. Therefore, it is advantageous to have the guide slots 26 designed as slots running fully through the wall of the tube 20, which now no longer shuts out incident light. A closed exterior tube can then be placed over tube 20 to form a laminated wall tube, having the same functional properties but with reduced cost of fabrication.

A slide 28, also activated by the pneumatic cylinder 27, is provided in the tube 20. When locking slide 4 is opened, this slide 28 also prevents incident light from coming through the guide shaft 10 into the interior of the device.

The receiving chamber 23 for film cartridges is formed by an appropriately shaped recess in carriage 22, and a flap 29, attached so as to swivel, as shown in FIG. 3. It is advantageous to have this flap 29 be spring-loaded, so that the film cartridges are held clamped in the receiving chamber 23 in a pincers-like manner.

If a filled magazine is slipped on, or if feed shaft 10 is filled with cartridges, then the lowest cartridge 11 is sensed by the scanner 17. A check is performed of whether it contains a roll of film, which can be handled in the same way as the previous films, e.g., whether the film should be processed using the same steps in the same order. If this is the case, then pneumatic cylinder 6 is activated, opening the locking slide 4, while clamping stamp 5 is activated simultaneously by the cams 3 and leaf spring 7 in such a way that it compresses cartridge 12 against the opposite wall of feed shaft 10, thereby holding it securely by frictional forces. If locking slide 4 is completely open, the lowermost film cartridge 11 drops through the opening 21 of tube 20, into the cartridge receiving chamber 23 of carriage 22.

Locking slide 4 is again closed by means of the pneumatic cylinder 6. The clamping of cartridge 12 by clamping stamp 5 is released. This film cartridge and film cartridge 13 that lies above it slide downward in feed shaft 10, until the lower side of cartridge 12 rests on locking slide 4. This condition is depicted in FIG. 2.

Locking slide 4 is shown in its closed position, preventing light from entering the interior of the device, in FIGS. 2 and 3. Therefore, slide 28 can be opened via pneumatic cylinder 27.

Pneumatic cylinder 24, which acts in connection with carriage 22, is then activated. While the carriage moves through tube 20, the cartridge 11 in receiving chamber 23 not only moves in linear fashion, but is simultaneously turned by 90 degrees. This is achieved by the two guiding pins 25 that are attached to the carriage 22 and slide in the guide slots 26 of tube 20. One of the guide slots 26 begins in the manner depicted on the bottom of the left side of the tube 20 and continuously runs via the back side upwards to the middle of the tube 20. The second guide slot 26 begins correspondingly at the top of the left side of the tube 20, and runs via the front side of the tube, here cut off and not depicted, downwards, likewise approximately to the middle of the tube. Thus, the link slots 26 form a helical cam. When carriage 22 is shifted forwards, the upper guiding pin 25 consequently moves forward out of the plane of the figures as depicted in FIG. 3. The lower guiding pin 25 moved backward into the plane of the figures. In each case they move to the middle of the tube 20. In this way, simultaneous with linear movement of the carriage, and rotation by 90 degrees is achieved.

The final position of carriage 22 is depicted in FIG. 3. The film cartridge here is in its position for removal.

The cartridge is held in this position by a mechanism that is not shown in the figures. While this is occurring, carriage 22 can again be drawn back by action of pneumatic cylinder 24 into its initial position, shown in FIG. 1. While this is taking place, flap 29 is opened briefly. However, it is again moved back into its closed position when the carriage has moved far enough so that the cartridge is outside receiving chamber 23. As soon as the carriage is back in its initial position, slide 28 is closed by the action of pneumatic cylinder 27. This ensures stray light will not enter the film removal point when locking slide 4 is again opened. Likewise, a mechanism (not described here in detail) is provided that holds flap 29 in this initial position of the carriage, to allow the cartridge to fall into the receiving chamber 23, and subsequently be clamped by the spring loaded flap 29. As a result of these actions, the device again is in the condition shown in FIG. 1, so that the next cartridge can be fed.

To ensure safe and appropriate functioning of the device, several sensing devices (not depicted here) are arrayed which check the particular conditions and generate messages in the event of possible errors. These sensing devices communicate with a control device which controls the system and generates appropriate messages in the event of any malfunctions.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. Consequently, the full scope of the invention should be ascertained by the appended claims.

What is claimed is:

1. A device for feeding film cartridges, each having a longitudinal axis, in a film handling device, comprising:

a first feed channel for guiding film cartridges, disposed so that a cartridge in the first channel moves through this channel in the direction of its longitudinal axis by its own weight;

means for separating adjacent cartridges in the direction of their longitudinal axis, by selectively holding an upper cartridge within the first channel secure by frictional engagement, while allowing a lower cartridge to advance; and a second feed channel disposed beneath the first channel for receiving the lower cartridge and guiding the lower cartridge to a feed point, remote from said first channel.

2. The device according to claim 1, wherein the feed channel comprises a magazine, having an aperture, the separating means comprising a member which protrudes through the aperture.

3. The device according to claim 1, wherein the separating means comprises a cartridge securing member having a member which impinges into the first feed channel.

4. The device according to claim 1, wherein the separating means comprises a clamping member for holding the cartridge secure.

5. The device according to claim 4, wherein the clamping member is formed as a stamp, equipped in the area that comes into contact with the cartridge with a friction-enhancing coating.

6. The device according to claim 5, wherein the stamp has a first position in which the stamp contacts the cartridge and a second position in which the stamp does not contact the cartridge, the stamp being displaceable between the first and second positions by a pneumatic cylinder.

7. The device according to claim 1, further comprising a locking device, situated beneath the separating means, having a first position in which advancement of a cartridge is blocked and a second position in which advancement of a cartridge is allowed.

8. The device according to claim 7, wherein the locking device is in the second position when the separating means holds the upper cartridge.

9. The device according to claim 7, wherein the locking device is in the second position when the separating means holds the upper cartridge, and the locking device is in the first position when the separating means is not holding the upper cartridge.

10. The device according to claim 1, further comprising means for controlling an advance of a lower cartridge to selectively feed a single cartridge from the device.

11. The device according to claim 10, wherein the separating means and advance controlling means are actuated by a single actuator.

12. The device according to claim 11, wherein the actuator is a pneumatic actuator.

13. The device according to claim 1, further comprising a repositioning device for rotating and displacing the lower cartridge in said second channel.

14. The device according to claim 13, wherein the second channel comprises a light tight chamber within which the lower cartridge is rotated and displaced.

15. The device according to claim 1, further comprising means to identify a film cartridge in the first channel.

16. The device according to claim 15, wherein the identifying means comprises an optical detection device which senses the lower cartridge.

17. The device according to claim 1, wherein said first and second channels are substantially straight and have a respective longitudinal axis, the longitudinal axis of the second channel extending substantially perpendicular to the longitudinal axis of the first channel.

* * * * *